(12) United States Patent
Auxerre

(10) Patent No.: US 6,460,589 B1
(45) Date of Patent: **\*Oct. 8, 2002**

(54) TIRE WITH LENGTHS OR ASSEMBLIES OF LENGTHS OF CIRCUMFERENTIAL BEAD REINFORCEMENT ELEMENTS

(75) Inventor: Pascal Auxerre, Royat (FR)

(73) Assignee: Compagnie Generale Des Etablissements Michelin-Michelin & Cie, Clermont-Ferrand Cedex ( \* ) Notice: Subject to any disclaimer, the term of this patent is extended or adjusted under 35 U.S.C. 154(b) by 131 days.

This patent is subject to a terminal disclaimer.

(21) Appl. No.: 09/614,625

(22) Filed: Jul. 12, 2000

Related U.S. Application Data

(63) Continuation of application No. PCT/EP98/08262, filed on Dec. 16, 1998.

(30) Foreign Application Priority Data

Jan. 12, 1998  (FR) .............................................. 98 00293

(51) Int. Cl.$^7$ .......................... B60C 15/00; B60C 15/04; B60C 15/06
(52) U.S. Cl. ......................... 152/540; 152/539; 152/543
(58) Field of Search ................................ 152/543, 539, 152/540

(56) References Cited

U.S. PATENT DOCUMENTS 4,508,152 A    4/1985   Sano et al.
4,852,626 A    8/1989   Tsukagoshi

FOREIGN PATENT DOCUMENTS

EP      0724973 A1    8/1996
GB      1574771       9/1980

OTHER PUBLICATIONS

Patent Abstracts of Japan, JP 61 016106 A, Radial Tyre for Truck and Bus, Sumitomo Rubber Ind Ltd, Jan. 24, 1986, Abstract.
Patent Abstracts of Japan, JP 08 150813, Pneumatic Radial Tire for Heavy Load, The Yokohama Rubber Co Ltd, Jun. 11, 1996, Abstract.

*Primary Examiner*—Adrienne C. Johnstone
(74) *Attorney, Agent, or Firm*—Baker Botts L.L.P.

(57) ABSTRACT

A tire, at least one radial carcass reinforcement of which is anchored within each bean B to a bead wire to form an upturn, characterized in that, viewed in meridian section, the carcass reinforcement has a meridian profile, in the region of the point of inflection J between the convex part and the concave part, which is reinforced axially to the inside by an additional reinforcement armature composed of at least one ply formed of circumferential metal elements.

5 Claims, 1 Drawing Sheet form of the rim flanges starting from a point of inflection
TIRE WITH LENGTHS OR ASSEMBLIES OF LENGTHS OF CIRCUMFERENTIAL BEAD REINFORCEMENT ELEMENTS This is a continuation of PCT/EP 98/08262, filed Dec. 16, 1998.

BACKGROUND OF INVENTION

The present invention relates to a tire with radial carcass reinforcement which is intended to bear heavy loads, and more particularly to a "heavy-vehicle"-type tire, intended to be fitted on vehicles such as, for example, lorries, road tractors, buses, trailers and others, and more particularly to the novel reinforcement structure for the beads of said tire.

Generally, a tire of the type in question comprises a carcass reinforcement formed of at least one ply of metal cables, which is anchored in each bead to at least one bead wire, forming an upturn. The carcass reinforcement is radially surmounted by a crown reinforcement, composed of at least two plies of metal cables which are crossed from one ply to the next, forming angles of between 10° and 45° with the circumferential direction. The carcass reinforcement upturns are generally reinforced by at least one bead reinforcement ply formed of metal cables which are oriented at a small angle relative to the circumferential direction, generally of between 10° and 30°.

In the case of the presence of a single bead reinforcement ply, the latter is generally located axially to the outside, along the carcass reinforcement upturn, with a radially upper end located above or below the radially upper end of the carcass reinforcement upturn. As for the radially lower end of such a reinforcement ply, it is generally located beneath a straight line parallel to the axis of rotation and passing approximately through the center of gravity of the meridian section of the anchoring bead wire of the carcass reinforcement.

The known solution aims to avoid deradialization of the cables of the carcass reinforcement upturn and to minimize the radial and circumferential deformations to which the end of said upturn and the outer rubber layer covering the bead and providing the connection to the rim are subjected.

The life of "heavy-vehicle" tires, owing to the progress achieved, and to the fact that certain types of travel are made less of a handicap as far as wear of the tread is concerned, has become such that it is also necessary to improve the endurance of the beads. Said improvement must focus on the degradation of the rubber layers at the level of the ends of the carcass reinforcement upturn and the radially outer ends of the bead reinforcement plies. More particularly in the case of tires which are subject to prolonged travel, which travel frequently induces a high temperature of the beads, owing to the temperatures which the mounting rims reach, the rubber mixes in contact with the rim are then subject to a reduction in their rigidity, and to more or less slow oxidation, hence the very marked tendency of the carcass reinforcement to unwind from around the bead wire under the action of the internal inflation pressure, despite the presence of one or more bead reinforcement plies. There then arise bead wire movements and shearing deformations at all the ends of the plies, resulting in the destruction of the bead. Said improvement must also, and primarily, focus on this second possibility of degradation.

The carcass reinforcement of a radial tire, mounted on its operating rim and inflated to the recommended pressure, has in one sidewall a regularly convex meridian profile between approximately the zones of connection with the meridian profile of the crown reinforcement and with the bead. In particular, starting from the radius where the carcass reinforcement is subject to the influence of the bead reinforcement ply (plies), said reinforcement has in the bead a meridian profile which is either substantially rectilinear or curved in the opposite direction to the curvature in the sidewalls, that is to say, substantially parallel to the curvature of the rim flanges starting from a point of inflection located radially approximately at the level of the radially upper end of the bead reinforcement ply placed along the carcass reinforcement upturn.

Such a meridian profile of the carcass reinforcement does not appear favourable to good endurance of the beads, which requires improvement when the loads borne become greater, or the inflation pressures lower, than the recommended loads and pressures.

French Patent 2 604 396, in order to improve the durability of a radialtire bead intended for intensive travel, proposes reinforcing the main part of the carcass reinforcement with two bead reinforcement armatures: one, located axially to the outside of the carcass reinforcement, being formed of layers of metal cables inclined relative to the meridian direction, the other, located axially to the inside of the carcass reinforcement, also being formed of layers of metal cables which are inclined in the opposite direction to the direction of inclination of the cables of the first layers, so as to obtain a triangulated overall reinforcement with the radial cables of the carcass reinforcement.

Research has led to the conclusion that the meridian profile of the carcass reinforcement in the region of the change of curvature within the bead needed to be reinforced by at least one bead reinforcement armature of circumferential reinforcement elements.

SUMMARY OF THE INVENTION

In order to improve the endurance of the beads of a tire, for a vehicle intended to bear heavy loads, said tire, according to the invention, comprising at least one radial carcass reinforcement which is formed of at least one ply of inextensible reinforcement elements and is anchored within each bead B to a bead wire to form an upturn, each bead B being reinforced by at least one additional reinforcement armature formed of metal elements, the non-upturned part of the carcass reinforcement, in the region of the bead located on either side of the point of inflection, where the trace of its meridian profile changes curvature to become rectilinear or concave, being reinforced, at least axially to the inside, by an additional reinforcement armature of at least one ply formed of metal reinforcement elements, the radially lower end of which is radially below the straight line D' which is parallel to the axis of rotation and passes through that point of the coating layer of the anchoring bead wire which is farthest from the axis of rotation, but above the straight line D which is parallel to the axis of rotation and passes through that point of the coating layer of the anchoring bead wire which is radially closest to the axis of rotation, and the radially upper end of which is located at a radial distance from the straight line D which lies between a quantity equal to half the radial distance between the straight lines D and D" increased by half the radial distance between the straight lines D and D' and a quantity equal to half the distance between the straight lines D and D" reduced by half the radial distance between the straight lines D and D', the straight line D" being the straight line at the point of greatest axial width, is characterized in that the reinforcement elements of the additional armature are lengths or assemblies of lengths of circumferential cables, of a circumferential length of between 0.2 and 0.4 times the circumferential length of the reinforcement armature (6A), measured upon the laying of said ply.

The straight line D" at the point of greatest axial width is, by definition, the straight line parallel to the axis of rotation and passing through the point in the meridian profile of the carcass reinforcement which corresponds to the point of greatest axial width when the tire is mounted on its operating rim, non-loaded and inflated to the recommended pressure.

The elements of the additional reinforcement armature are said to be circumferential if the angle which they form with the circumferential direction is between +5° and −5°.

This structure thus permits partial takeup of the tensile forces to which the carcass reinforcement is subjected, and thus minimizes the radial deformations at the ends of the carcass reinforcement upturn, whatever the conditions of travel.

The takeup of the forces will be all the greater if the reinforcement elements of the additional ply are parallel to each other in the additional ply (plies) and adjoining over the entire width of the reinforcement armature. Reinforcement elements are said to be adjoining if, in the direction perpendicular to said elements, the distance between two adjacent elements is reduced as much as possible.

The presence of a second additional bead reinforcement armature located axially to the outside of the carcass reinforcement upturn is particularly beneficial for the endurance of the beads during travel under a great excess load. Said second additional armature will preferably be formed of at least one ply of metal reinforcement elements forming with the circumferential direction an angle which may be between 0° and 30°, the value of 0° being included in the range in question.

The takeup of the meridian tensile forces of a carcass reinforcement is known per se from numerous documents. French Patent 750 726 teaches gluing carcass reinforcement plies to auxiliary reinforcements, each formed of a cord wound in a spiral and consequently having significant flexibility in the transverse direction. Said gluing is effected such that two carcass reinforcement plies tightly surround an auxiliary reinforcement, this surrounding being in the absence of a bead wire and a carcass reinforcement upturn.

French Patent 1 169 474 also teaches dispensing with the bead wire usually used by small plies of metal cords or cables inclined on the parallel hooking line, the angle of inclination possibly being as low as 5°, the carcass reinforcement ply (plies) being turned up or not turned up.

French Patent 1 234 995 provides for the replacement of the usually oblique reinforcement elements of the bead reinforcement ply (plies) which is (are) intended to reduce the movements of hooking against the rim flange with circumferential elements, the reinforcement armature possibly being arranged between the main part of the carcass reinforcement and the upturn of said reinforcement, or axially to the outside of said carcass reinforcement upturn.

The same bead reinforcement armatures with circumferential elements are found in French Patent 1 256 432, said elements being intended to take up the tensile forces of the carcass reinforcement in their entirety, and in the case of tires for passenger vehicles, in the absence of anchoring bead wires or any other reinforcement ply.

FR 2 055 988 describes a certain number of possible applications of a bead reinforcement armature having circumferential elements, in particular the use of such an armature in the place of the conventional armature of oblique elements which are arranged axially to the outside of the carcass reinforcement upturn.

French Patent 2 730 190, in order to improve the endurance of the beads of a tire, proposes the reinforcement of said beads by at least one additional ply of circumferential metal cables which is wound around the anchoring bead wire of the carcass reinforcement, and the two axially inner and outer strands of which are located above a straight line parallel to the axis of rotation and passing through that point of the bead wire which is farthest from said axis.

Not only does the combination of the meridian profile of the carcass reinforcement having points of inflection in the beads with the presence of a bead reinforcement armature, having circumferential elements, and arranged within the non-upturned part of the carcass reinforcement, permit improvement of the endurance of the beads, but also it makes it possible to obtain a very substantial reduction in the weight of a tire while not adversely affecting its properties, when the presence of a bead reinforcement armature described above is combined with replacing the bead wire having rectangular metal wires which is generally used in the type of tire in question with a more economical bead wire of the braided type, that is to say, one formed of helical braiding of several metal wires, or a bead wire of the type having a stack of polygonal section, that is to say, a bead wire obtained by winding a metal wire on a form, resulting in several layers of different widths. The types of bead wire above mean that less space is taken up owing to the shape of their cross-section and the possible reduction of said section, of the order of 30% and 50% respectively, which, in relation to the application of the invention to the case of a bead wire having rectangular wires, which takes up more space, results in having either a lesser thickness of bead.

The use as reinforcement elements of lengths or assemblies or groups of lengths of cables of a circumferential length of between 0.2 and 0.4 times the circumferential length of the reinforcement armature, which permits laying of the bead reinforcement armature on the building drum for the raw blank of the carcass reinforcement and the shaping of said blank into a torus without major difficulties, and said average length being measured upon laying on said building drum. The circumferential gaps or cuts between cut elements will preferably be offset from each other.

The same applies to the second additional armature, axially to the outside of the carcass reinforcement upturn, when the latter is formed of 0° metal elements, said elements then advantageously being lengths or assemblies of lengths of cables, of a circumferential length of between 0.2 and 0.4 times the average circumferential length of the reinforcement ply.

The characteristics of the invention will be better understood with reference to the following description, which refers to the drawing, which illustrates examples of embodiment in non-limitative manner.

DESCRIPTION OF PREFERRED EMBODIMENTS

Figure 1:
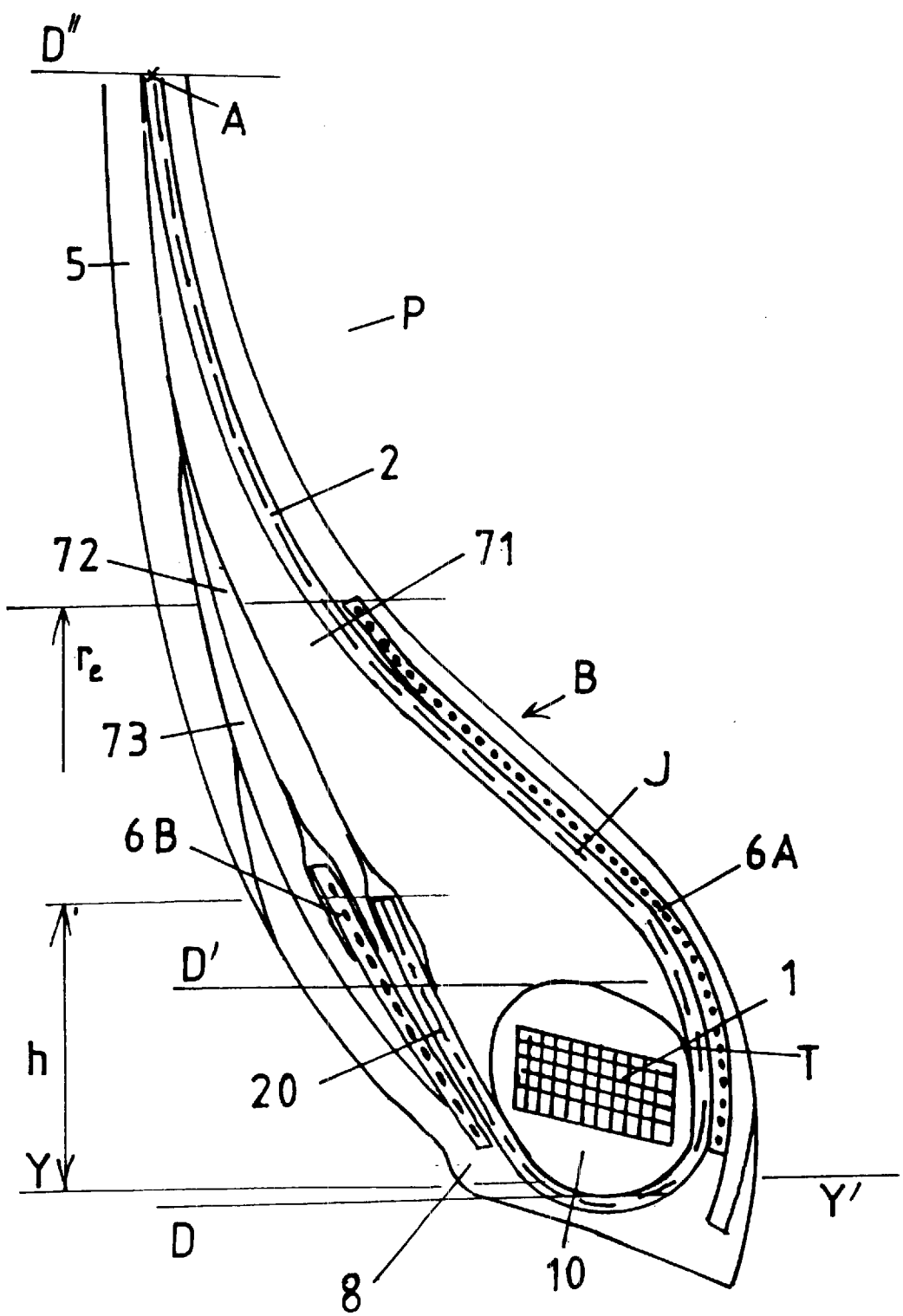
FIG. 1 is a sectional view of a tire structure according to the invention.

The tire P shown in FIG. 1 is a tire of dimension 315/80 R 22.5, which is intended to be mounted on a rim comprising rim seats inclined at 15°. Said tire comprises a tread (not shown) joined to two beads B by means of two sidewalls. Each bead B is reinforced by a bead wire 1 formed by winding a cord of quadrilateral section on a suitable form until a plurality of radially juxtaposed rows of cords is obtained. Around said bead wire there is anchored a carcass reinforcement 2, composed of a single ply of metal cables. The carcass reinforcement 2, viewed in meridian section, has a meridian profile, between the point A of greatest axial width and the point of tangency T of said profile with the virtually circular coating layer 10 of the bead wire 1 (it is said to be virtually circular because the coating layer practically never has a perfectly circular transverse shape), having two curvatures: the profile is convex from point A to the point of inflection J located radially above the bead wire, and is concave from said point of inflection J to the point of tangency T.

The carcass reinforcement is anchored by an upturn 20 around the layer 10 of rubber mix which covers the bead wire 1, the radial distance h between the radially upper end of said upturn 20 and the straight line YY' parallel to the axis of rotation and defining the nominal diameter of the bead (which, in the case described, is the same as the diameter of the operating rim) being equal, in the example in question of the tire of dimension 315/80 R 22.5, to 37 mm.

Between the carcass reinforcement 2 and its upturn 20, radially above the bead wire 1, there is arranged a bead wire filler 71 of rubber mix of a generally high Shore hardness. The bead B of the tire, according to the invention, is reinforced by a first additional reinforcement armature 6A composed of a ply of elements of a high modulus of elasticity which are arranged circumferentially, said ply 6A being located axially to the inside of the non-upturned or main part of the carcass reinforcement 2, in the region located on either side of the point of inflection J in which the meridian profile of the carcass reinforcement changes curvature. The reinforcement elements of the ply 6A are cut metal 27×23 cables, the length of said elements or lengths of cables being equal to one quarter of the circumferential length of said ply 6A, measured when it is laid on the building drum for the carcass reinforcement blank, and the spaces between ends of elements are of low amplitude: 3 mm (also measured during laying) and are circumferentially offset from each other. The radially lower end of the ply 6A is substantially arranged on a straight line parallel to the axis of rotation and passing through that point of the bead wire 1 which is closest to the axis of rotation, which point is located at a distance of 290 mm from the axis of rotation, which lies between the distance of 280 mm between the axis of rotation and the straight line D passing through that point of the coating layer 10 of the anchoring bead wire 1 which is closest to the axis of rotation and the distance of 305 mm between the axis of rotation and the straight line D' passing through that point of the coating layer 10 which is farthest from said axis of rotation.

As for the radially upper end, it is located radially, in the case described, at a distance $r_e$ from the axis of rotation equal to 335 mm, which quantity lies between a quantity of 357.5 mm, which is equal to half the total of 345 mm of the respective distances of the straight lines D and D" from the axis of rotation (410+280)/2, the straight line D" at the point of greatest axial width passing through the point A being 410 mm from the axis of rotation, increased by half the radial distance of 12.5 mm between the straight lines D and D' (305−280)/2, and a quantity of 332.5 mm, which is equal to half the total 345 mm of the respective distances of the straight lines D and D" from the axis of rotation, reduced by half the radial distance of 12.5 mm between the straight lines D and D'.

The bead B is furthermore reinforced axially to the outside of the upturn 20 of the carcass reinforcement 2 by a second additional armature 6B, composed of a ply of continuous metal 27×23 cables which are parallel to each other in the ply 6B and form an angle of more than 0°, and precisely equal to 22°, with the circumferential direction. The radially outer end of this additional second ply 6B is located radially above the end of the upturn 20 of the carcass reinforcement 2, whereas its radially lower end is located practically on the same straight line, parallel to the axis of rotation, and where the radially lower end of the first additional ply is located. Said ply 6B is firstly separated from the carcass reinforcement 2 and the bead wire filler 71 by a second fill-in filler 72 and secondly separated from the protective rubber mix 8, which surrounds the bead B, by a third filler 73.

Tires as described above, and referred to as $P_{AB}$, were compared firstly:

with conventional tires $P_A$, that is to say, tires with beads which comprise only a single additional bead reinforcement ply 6B, said one ply being formed of continuous metal cables oriented at 22° relative to the circumferential direction and arranged axially to the outside of the carcass reinforcement upturn;

with tires $P_T$ which do not comprise any additional reinforcement ply in the beads;

with tires $P_B$ with beads which comprise only a single additional bead reinforcement ply 6A, said one ply being formed of lengths of metal cables oriented circumferentially, and being arranged axially to the inside of the carcass reinforcement.

The comparison was made based on two quality criteria which are fundamental to the endurance of tire beads: endurance under excess load, and endurance on a hot rim. Under the same rolling conditions for all the tires tested, the tires $P_T$ on average (2 tested per category) covered 24,000 km traveling under excess load and 2,600 km traveling with a hot rim. The tires $P_B$ having a single ply of lengths at 0° covered 101,000 km and 8,100 km respectively in the same types of travel, which represents a significant gain, whatever the type of travel. The tires $P_A$, which are conventional tires, covered 53,000 km and 5,200 km respectively in the two tests, whereas the tires $P_{AB}$ as described above covered 156,000 km and 8,200 km respectively in the two types of travel in question. These results, which represent significant, and largely unexpected, progress, perfectly highlight the effect of the presence of an additional reinforcement ply of discontinuous circumferential metal elements axially to the inside of the carcass reinforcement, combined with the presence of an additional reinforcement ply of continuous metal elements which form with the circumferential direction a small angle axially to the outside of the carcass reinforcement upturn.

I claim:

1. A tire, comprising at least one radial carcass reinforcement which is formed of at least one ply of inextensible reinforcement elements and is anchored within each bead B to a bead wire to form an upturn, said carcass reinforcement being assembled as a raw blank on a building drum prior to shaping into a torus, the non-upturned part of the carcass reinforcement, in the region of the bead located on either side of the point of inflection where the trace of its meridian profile changes curvature to become rectilinear or concave, being reinforced, at least axially to the inside, by an additional reinforcement armature of at least one ply formed of metal reinforcement elements, the radially lower end of which is radially below a straight line D' which is parallel to the axis of rotation and passes through that point of the coating layer of the anchoring bead wire which is radially farthest from the axis of rotation, but above a straight line D which is parallel to the axis of rotation and passes through that point of the coating layer of the anchoring bead wire which is radially closest to the axis of rotation, and the radially upper end of which is located at a radial distance from the straight line D which is between a quantity equal to half the radial distance between the straight lines D and D" increased by half the radial distance between the straight lines D and D' and a quantity equal to half the radial distance between the straight lines D and D' reduced by half the radial distance between the straight lines D and D', the straight line D" being the straight line at the point of greatest axial width, the tire being characterized in that the reinforcement elements of the additional reinforcement armature are lengths or assemblies of lengths of circumferential cables, of a circumferential length of between 0.2 and 0.4 times the average circumferential length of the additional reinforcement armature, as measured upon the laying of said at least one ply of said additional reinforcement armature on the building drum for the carcass reinforcement blank.

2. A tire according to claim 1, characterized in that there are gaps or cuts between said circumferential lengths or assemblies of lengths that are offset from each other.

3. A tire according to claim 1, characterized in that at least one bead B is reinforced by a second additional reinforcement armature, located axially to the outside of the upturn of the at least one carcass reinforcement, composed of at least one ply formed of metal reinforcement elements forming with the circumferential direction an angle which may be between 0° and 30°, the value of 0° being included in the range in question.

4. A tire according to claim 3, characterized in that the at least one ply of the second additional reinforcement armature is formed of continuous metal elements made of steel, which form an angle greater than 0° with the circumferential direction.

5. A tire according to claim 1, characterized in that the anchoring bead wire of the at least one carcass reinforcement is a braided bead wire.

* * * * *

UNITED STATES PATENT AND TRADEMARK OFFICE
CERTIFICATE OF CORRECTION

PATENT NO. : 6,460,589 B1
DATED : October 8, 2002
INVENTOR(S) : Auxerre, Pascal

It is certified that error appears in the above-identified patent and that said Letters Patent is hereby corrected as shown below:

Title page,
Item [57], ABSTRACT,
Line 2, "bean" should read -- bead --
Item [73], Assignee, "Generale" should read -- Générale --

Column 2,
Line 18, "radialtire" should read -- radial tire --

Column 4,
Line 5, "atire" should read -- a tire --

Column 7,
Line 12, " D and D' " should read -- D and D" --

Signed and Sealed this

Twenty-second Day of July, 2003

JAMES E. ROGAN
*Director of the United States Patent and Trademark Office*